United States Patent
Miersch-Wiemers

(10) Patent No.: US 7,946,272 B2
(45) Date of Patent: May 24, 2011

(54) METHOD FOR DETERMINING THE COMPOSITION OF A FUEL BLEND

(75) Inventor: Oliver Miersch-Wiemers, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 163 days.

(21) Appl. No.: 12/203,532

(22) Filed: Sep. 3, 2008

(65) Prior Publication Data

US 2009/0064969 A1 Mar. 12, 2009

(30) Foreign Application Priority Data

Sep. 6, 2007 (DE) .......................... 10 2007 042 403

(51) Int. Cl.
F02P 5/04 (2006.01)
(52) U.S. Cl. .................. 123/406.14; 701/102
(58) Field of Classification Search .......... 123/406.11–406.14, 406.24, 406.59, 123/339.1, 339.11, 316, 676, 339.24, 406.15, 123/406.23, 406.25–406.27; 701/101–103, 701/110, 111, 114; 702/182, 183, 185; 73/114.04, 73/114.08, 114.13, 114.15, 114.25, 114.38, 73/114.52, 114.53

See application file for complete search history.

(56) References Cited

U.S. PATENT DOCUMENTS

| | | | | |
|---|---|---|---|---|
| 5,157,613 A | * | 10/1992 | Williams et al. | 701/111 |
| 5,231,358 A | * | 7/1993 | Kapsokavathis et al. | 324/672 |
| 5,383,432 A | * | 1/1995 | Cullen et al. | 123/406.45 |
| 5,878,717 A | * | 3/1999 | Zur Loye | 123/435 |
| 6,023,965 A | * | 2/2000 | Kennie et al. | 73/114.38 |
| 6,714,856 B2 | * | 3/2004 | Huff et al. | 701/114 |
| 6,725,830 B2 | * | 4/2004 | Surnilla | 123/339.11 |
| 7,357,101 B2 | * | 4/2008 | Boyarski | 123/1 A |
| 2003/0221664 A1 | * | 12/2003 | Surnilla | 123/339.11 |
| 2007/0157903 A1 | | 7/2007 | Zurlo | |
| 2008/0156303 A1 | * | 7/2008 | Bromberg et al. | 123/575 |

FOREIGN PATENT DOCUMENTS

| | | |
|---|---|---|
| DE | 29 52 073 | 6/1981 |
| DE | 38 33 123 | 4/1989 |
| DE | 41 17 440 | 12/1991 |
| JP | 2007-137321 | 6/2007 |

* cited by examiner

Primary Examiner — Stephen K Cronin
Assistant Examiner — Johnny H Hoang
(74) Attorney, Agent, or Firm — Merchant & Gould P.C.

(57) ABSTRACT

A method for determining composition of a fuel blend from a first and at least a second fuel for operating an internal combustion engine. An ignition angle of the internal combustion engine is altered and a non-intermittent fluctuation in torque, which is a function of ignition angle, and/or a non-intermittent rotational discontinuity, and/or a variable derived from the discontinuity is used as a parameter for determining the composition of the fuel blend.

6 Claims, No Drawings

METHOD FOR DETERMINING THE COMPOSITION OF A FUEL BLEND

TECHNICAL FIELD

The invention relates to a method for determining the composition of a fuel blend from a first and at least a second fuel for operating an internal combustion engine.

BACKGROUND

Internal combustion engines on the basis of Otto (gasoline) engines are generally operated with fuel from hydrocarbons, from fossil fuels based on refined crude oil. Ethanol produced from renewable resources (plants) or another kind of alcohol is increasingly being added in various mixing ratios to the fuel. In the USA and Europe a blend of 70-85% ethanol and 15-30% gasoline is often distributed under the trade name E85. The internal combustion engines are designed in such a way that they can be operated with pure gasoline as well as with blends up to E85. This is denoted as a "flex-fuel operation". The operating parameters in the flex-fuel operation have to be adapted in each case to the existing fuel blend for an efficient operation with only a small discharge of toxic emissions; while at the same time a high engine output and a good starting performance are guaranteed. A stoichiometric fuel-air ratio is, for example, present at 14.7 mass parts of air per part of gasoline; however, when using ethanol, a proportion of air of 9 mass parts must be set. Furthermore, the ignition angle of the internal combustion engine has to be adapted to the mixing ratio for optimal combustion. Due to the different evaporation characteristics of ethanol and gasoline, different richening factors have to be specified as a function of the mixing ratio during start-up of the internal combustion engine. The diagnostic thresholds, which are to be used for the self-diagnosis of the internal combustion engine, the so-called on-board diagnosis, are likewise dependent on the composition of the fuel blend. Knowledge of the prevailing fuel mixing ratio is therefore of fundamental importance for the operation of the internal combustion engine.

A method for adaptively adjusting a fuel/air mixture to take into account fuel characteristics during the operation of an internal combustion engine is known from the German patent DE 41 17 440 C2. Said internal combustion engine is provided with a lambda controller, which emits a control factor RF, and also with an adaptation integrator, which emits an adaptation factor AF with variable adaptation speed, which in addition to the control factor FR manipulates the adjustment of the fuel/air mixture. Provision is thereby made for a test to be made to determine whether the lambda closed-loop control deviation amplitude exceeds a first threshold value; and if this is the case, the adaptation speed is set to an increased value up until a specified condition is met. Thereafter said adaptation speed is set back to a low value. The underlying method is known as a fuel adaptation.

The fuel adaptation allows for internal combustion engines, which can be operated with different fuel blends, to be operated trouble-free. Hence, the duration of injection must be lengthened by more than 40% when changing from a fuel consisting of pure gasoline to a fuel blend of 85% ethanol and 15% gasoline in order to maintain the same lambda values in the exhaust gas. This stems from the different air requirement for a stoichiometric combustion. According to the method described in the German patent DE 41 17 440 C2, a corresponding adaptation intervention is additionally performed. Because a very pronounced correction of the durations of injection and thereby of the adaptation intervention must be performed in the event of a change in fuel blends in comparison to the effects of wear or manufacturing, the adaptation speed resulting from a detected change in fuel blends is significantly increased in the proposed method.

Repeated fueling of small quantities of fuel or a skewing of the determination of the fill level by the motor vehicle not being parked on a level surface can, however, lead to a faulty adaptation of the ethanol value and consequently can also complicate a correct adaptation of the diagnostic thresholds for the on-board diagnosis. An insufficient mixing of the fuel components can also have a troublesome effect on the adaptation.

Additional methods are known from the patent literature. Said methods allow for the different characteristics of the fuel being used, among other things due to the different mixing ratios of fossil fuels and alcohols, to be inferred and for a corresponding adaptation of the operating parameters of the internal combustion engine.

A method for optimizing the work cycle of an internal combustion engine with an externally-supplied ignition is known from the German patent DE 29 52 073 A1. In this method, power train data of the internal combustion engine and in fact among other things the current relative angular position of the crankshaft (crank angle) are measured and are provided to an electronic control unit, wherein said data are accordingly allowed to affect the ignition timing and/or the quantity of fuel supplied. In so doing, provision is made for at least one of these control variables to be varied from work cycle to work cycle around an approximate nominal value for the ignition timing and/or the quantity of fuel supplied, for the current indicated pressure or a variable, which analogously changes with it, to be continuously measured in addition to the crank angle, for the average indicated pressure, respectively an analogous variable, to be calculated in each case from said continuous measurements and from the piston position, which is ascertained versus the crank angle, during every power stroke and for the sequentially arranged, calculated values of the average indicated pressure, which are automatically indexed and consecutive values, to be compared with each other. In the process, the variation of the control variable is aborted and the prevailing value of the control variable is retained for each operating state of the internal combustion engine as soon as the average indicated pressure achieves a maximum value. The method allows among other things for the compensation for deviations from the control parameters in the open-loop control of the internal combustion engine, which arise from the use of different fuels, as, for example, methanol, ethanol and gasoline.

A device for the acquisition of the fuel characteristics for an internal combustion engine is known from the German patent DE 38 33 123 A1, wherein the quantity of intake air and the air/fuel ratio in the exhaust gas are measured, a base quantity of injected fuel is calculated on the basis of the quantity of intake air and the quantity of the fuel to be injected is controlled in a closed-loop corresponding to the air/fuel ratio. The device is characterized by wherewithal, which acquires pressure, for the acquisition of the internal cylinder pressure, wherewithal, which acquires crank angle, for the acquisition of the crank angle of the internal combustion engine and by a monitoring mechanism, which receives signals from the wherewithal, which acquires pressure, and the wherewithal, which acquires crank angle. Said monitoring mechanism calculates an effective heating value Q of the fuel in an ignition cycle on the basis of the internal cylinder pressure $P(\theta)$ at a crank angle in the compression and expansion (combustion) strokes of an ignition cycle, on the basis of the crank angle θ and on the basis of the cylinder capacity V (θ); and said monitoring mechanism ascertains an effective combustion value K or a lower heating value Hu of the fuel. In so doing, the characteristics of the fuel are acquired with the aid of at least the effective combustion value K or the lower heating value Hu or the ratio (Ti/Hu) of the duration Ti of a fuel injection pulse to the heating value Hu.

SUMMARY

It is the task of the invention to provide a method, which allows for the determination of the fuel mixing ratio in internal combustion engines, which can be operated with different fuels or fuel blends, without requiring an additional, special fuel sensor.

DETAILED DESCRIPTION

The task of the invention is thereby solved, in that the ignition angle of the internal combustion engine is altered and in that a non-intermittent fluctuation in torque, which is a function of the ignition angle, and/or a non-intermittent rotational discontinuity and/or a variable derived from said discontinuity is used as the parameter for determining the composition of the fuel blend. The degree of efficiency of an internal combustion engine is a function of the ignition angle. Starting from an optimal ignition angle with maximum degree of efficiency, the degree of efficiency monotonically decreases when the ignition angle is altered toward an advanced or a retarded ignition point. As a result, the torque of the internal combustion engine changes when otherwise the operating parameters of said internal combustion engine remain the same; and in so doing, the maximum torque occurs at the maximum degree of efficiency. It is known that the intermittent fluctuation of the torque is likewise maximal over a cycle of the internal combustion engine at maximum torque. It is known that the optimal ignition angle is a function of the composition of the fuel blend. Furthermore, fuel blends with different compositions have a different knocking limit. The knocking limit thereby denotes the ignition angle, whereat a predetermined quantity of knocking combustion occurs.

If the ignition angle is now displaced from the optimal ignition angle in the direction of an advanced or a retarded ignition point, the engine smoothness decreases. For instance, the displacement of the ignition angle in the direction of a retarded ignition point, leads to misfires, which cause a decrease in engine smoothness and consequently a non-intermittent fluctuation in the engine rotational speed and the engine torque. According to the technical field, a discontinuity of the rotational movement of the internal combustion engine can be determined with an engine rotational speed sensor or a crankshaft angle sensor, for which provision has generally already been made in the internal combustion engine. For this reason, they present no additional expenditure or complexity. A torque sensor and/or a combustion chamber pressure sensor can be used for determining the torque and its intermittent and non-intermittent percentages. A displacement of the ignition in the direction of an advanced ignition point leads to a knocking combustion, which likewise causes a decrease in engine smoothness and a non-intermittent fluctuation in the engine rotational speed and the engine torque. The ignition angle, whereat a predetermined uneven running of the internal combustion engine occurs, can consequently be used to determine the composition of the fuel blend.

An especially small impairment of the driving comfort can be achieved, in that the ignition angle of not all of the cylinders of the internal combustion engine is displaced, but only the ignition angle of one or several cylinders in the direction of an advanced or a retarded ignition point. The uneven running of the internal combustion engine can also be evaluated by an angle of rotation sensor at the crankshaft or a knock sensor when such an action is performed.

Provision is made in the method according to the invention for the ignition angle to be maximally displaced up to the knocking limit and/or up to the misfire limit. It can already suffice for determining the composition of the fuel blend if the ignition angle is displaced only a little from the optimal ignition angle. In this case, the change in torque, which occurs, remains small, or only small alterations in the operating parameters of the internal combustion engine have to be performed in order to maintain the torque essentially constant and for the action to proceed without the driver noticing.

If the operating parameters of the internal combustion engine are adapted in such a way, that when the ignition angle is altered, the average torque essentially remains constant over a cycle of the internal combustion engine, the action can thus be implemented without the driver of the motor vehicle noticing and without impairment of the driving comfort. In addition the rate of air flow and the fuel supply can be controlled in a closed loop in such a way, that when the ignition angle is altered, the torque of the internal combustion engine is maintained at least approximately constant.

If provision is made for the composition of the fuel blend, which was ascertained, to be compared with a composition of the fuel blend, which was determined by a fuel composition sensor and/or in a fuel adaptation and for a malfunction to be suggested if the difference between the compositions of the fuel blends, which were determined, exceeds a specified threshold value, the composition of the fuel blend, which was ascertained with the aid of the fuel composition sensor or the fuel adaptation, can thus be monitored within the scope of a plausibility consideration. A faulty adaptation of a mixture error can, for example, be reversed by the fuel adaptation.

The method is preferably employed for determining the composition of a gas/ethanol fuel blend and/or a gas/methanol fuel blend and/or a gas/ethanol/methanol fuel blend. All of these fuels and fuel blends display a different dependence of the uneven running of the internal combustion engine on the ignition angle, so that an unambiguous assignment of the fuel, respectively the fuel blend, is possible via the method described.

The invention claimed is:

1. A method of determining an unknown fuel blend composition, the fuel blend including a first and at least a second fuel for operating an internal combustion engine, the method comprising:
   operating the internal combustion engine with the unknown fuel blend composition;
   altering an ignition angle of the internal combustion engine; and
   determining a plurality of engine parameters comprising: a non-intermittent fluctuation of a torque that is a function of the ignition angle, a non-intermittent rotational discontinuity, and a variable derived from said discontinuity;
   wherein at least one of the plurality of engine parameters is used for determining the unknown fuel blend composition.

2. A method according to claim 1, further comprising displacing the ignition angle of one or several cylinders in at least one of a direction of an advanced ignition point and a retarded ignition point.

3. A method according to claim 2, further comprising maximally displacing the ignition angle up to at least one of a knocking limit and a misfire limit.

4. A method according claim 1, further comprising adapting one or more operating parameters of the internal combustion engine such that when the ignition angle is altered, an average torque essentially remains constant over a cycle of the internal combustion engine.

5. A method according claim 1, further comprising comparing the ascertained composition of the fuel blend with a composition of the fuel blend determined by at least one of a fuel composition sensor and in a fuel adaptation, wherein a malfunction is suggested if a difference between the two compositions of the fuel blend exceeds a specified threshold.

6. A method according to claim 1, further comprising determining the composition of one of: a gas/ethanol fuel blend; a gas/methanol fuel blend; or a gas/ethanol/methanol fuel blend.

* * * * *